(12) United States Patent
Gupta

(10) Patent No.: US 6,226,679 B1
(45) Date of Patent: *May 1, 2001

(54) COMMON MANAGEMENT INFORMATION PROTOCOL (CMIP) AGENT REGISTRATION METHODS SYSTEMS AND COMPUTER PROGRAM PRODUCTS

(75) Inventor: Pradeep Gupta, Mountain View, CA (US)

(73) Assignee: Sun Microsystems, Inc., Palo Alto, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/885,231

(22) Filed: Jun. 30, 1997

(51) Int. Cl.[7] .................................................. G06F 13/00
(52) U.S. Cl. .............................................. 709/230; 709/224
(58) Field of Search ........................... 395/500, 200.58, 395/200.32; 370/94.1, 248; 709/200, 201, 217, 223, 238.23, 224; 379/34; 707/101

(56) References Cited

U.S. PATENT DOCUMENTS

| | | | |
|---|---|---|---|
| 5,261,044 | 11/1993 | Dev et al. ........................... 395/159 |
| 5,295,244 | 3/1994 | Dev et al. ........................... 395/161 |
| 5,317,742 | 5/1994 | Bapat .................................... 395/700 |
| 5,436,909 | 7/1995 | Dev et al. ......................... 371/20.1 |
| 5,452,433 | * 9/1995 | Nihart et al. ........................ 395/500 |
| 5,491,796 | * 2/1996 | Wanderer et al. .................... 709/217 |
| 5,491,822 | 2/1996 | Allen et al. .......................... 395/700 |
| 5,504,921 | 4/1996 | Dev et al. ............................ 395/800 |
| 5,522,042 | * 5/1996 | Fee et al. .............................. 709/200 |
| 5,619,615 | * 4/1997 | Pitchaikani et al. ................. 395/11 |
| 5,623,403 | * 4/1997 | Highbloom ........................ 395/228 |
| 5,655,081 | * 8/1997 | Bonnell et al. ...................... 709/202 |
| 5,704,041 | * 12/1997 | Allen et al. .......................... 709/238 |
| 5,729,689 | * 3/1998 | Allard et al. .................... 395/200.58 |
| 5,740,362 | * 4/1998 | Buickel et al. ...................... 709/201 |
| 5,740,368 | * 4/1998 | Villalpando ......................... 709/202 |
| 5,758,083 | * 5/1998 | Singh et al. ......................... 709/223 |
| 5,764,911 | * 6/1998 | Tezuka et al. ....................... 709/223 |
| 5,802,146 | * 9/1998 | Dulman ................................ 379/34 |
| 5,812,771 | * 9/1998 | Fee et al. .............................. 709/201 |
| 5,822,569 | * 10/1998 | McPartlan et al. .................. 395/500 |
| 5,826,239 | * 10/1998 | Du et al. .................................. 705/8 |
| 5,848,243 | * 12/1998 | Kulkarni et al. .................... 709/224 |
| 5,870,749 | * 2/1999 | Adusumilli .......................... 707/101 |
| 5,881,051 | * 3/1999 | Arrowood et al. .................. 370/248 |
| 5,884,324 | * 3/1999 | Cheng et al. ........................ 707/201 |
| 5,931,911 | * 8/1999 | Remy et al. ......................... 709/223 |
| 5,960,176 | * 9/1999 | Kuroki et al. ....................... 709/223 |
| 5,978,845 | * 11/1999 | Reisacher ............................ 709/223 |
| 5,991,305 | * 2/1999 | Simmons et al. ................... 370/422 |
| 5,996,010 | * 11/1999 | Leong et al. ........................ 709/223 |
| 6,003,077 | * 12/1999 | Bawden et al. ..................... 709/223 |
| 6,012,152 | * 1/2000 | Douik et al. ........................... 714/26 |

OTHER PUBLICATIONS

McCloghrie, The Simple Times, http://www.simple-times.org/pub/simple-times/issues/3-1.html, Feb. 1994.*

Akmqvist et al, Standardizing energy management by using SNMP, IEEE, Apr. 1994.*

* cited by examiner

Primary Examiner—Robert B. Harrell
Assistant Examiner—Thong Vu
(74) Attorney, Agent, or Firm—Conley, Rose & Tayon, PC

(57) ABSTRACT

A computer network includes a local management information server (MIS) and a common management information protocol (CMIP) management protocol adapter (MPA) for communication between the local MIS and remote agents characterized by an unknown information model. The network relies upon a computer program product which identifies remote agent communication events representing a remote agent association requests received by the CMIP MPA. The CMIP MPA includes a device for translating messages transmitted between a remote agent and said local MIS.

28 Claims, 9 Drawing Sheets

NAME TRANSLATION OBJECT CLASS (NTOC)
[MpaPmi]

TRANSLATES NAMES PURSUANT TO TRANSLATE OI( )
CALL OF PUBLIC METHODS MANAGER2AGENTDN( ) AND
AGENT2MANAGERDN( )
41

MANAGEMENT OBJECT INSTANCES (MOI) ARE
TRANSLATED TO AGENT OBJECT INSTANCES (AOI)
AND
AGENT OBJECT INSTANCES (AOI) ARE TRANSLATED TO
MANAGEMENT OBJECT INSTANCES (MOI)
42

FIG. 5

COMMON MANAGEMENT INFORMATION PROTOCOL (CMIP) AGENT REGISTRATION METHODS SYSTEMS AND COMPUTER PROGRAM PRODUCTS

CROSS-REFERENCE TO RELATED APPLICATIONS

This application is a continuing prosecution application of U.S. patent application, Ser. No. 08/885,231, filed on Jun. 30 1997.

Portions of this patent document contain material subject to copyright protection. The copyright owner has no objection to facsimile reproduction of the patent document after grant, as it appears in the U.S. Patent and Trademark Office files or records, but otherwise reserves all rights relating thereto.

TECHNICAL FIELD

The field of the present invention relates to common management information protocol (CMIP) agent registration methods, systems and computer program products, and more particularly to methods, systems and computer program products for autoregistration of CMIP agents with UNIX processes acting as a gateway between a management information server (MIS) running on a host and external entities which communicate with the local host MIS.

BACKGROUND OF THE INVENTION

Common management information protocol (CMIP) management protocol adapter (MPA) is a UNIX process which serves as a gateway between a local MIS running on a local host and an external or remote entity or agent, such as another MIS or a third party manager. The remote entity or agent communicates with the local MIS using CMIP protocols. FIG. 1A is a block diagram of a prior art UNIX network 2 including a local host 3 and a remote MIS 4 in communication with each other. The local host 3 has installed thereupon a local MIS 3' and a CMIP MPA 5 which is connected between the local MIS 3' and the remote MIS 4 for bilateral communication. Remote MIS 4 is a third party manager or an agent or another kind of a communicating entity. CMIP MPA 5 acts as a UNIX process gateway using CMIP protocol to effect communication between a local MIS 3' and a remote MIS 4. For communication according to the prior art, the local MIS is preconfigured according to at least a single predetermined agent information model. As shown in the block diagram of FIG. 1B, the prior art local MIS 3' includes an information model 13 which is preconfigured with a configuration model for each predetermined communicating remote entity 14, but not for unanticipated agents. If an agent or remote MIS which does not conform to the predetermined agent information model prepared in anticipation of agent communication by the local MIS, then run-time communications between hosts and particular remote entities are prevented. It is desirable to overcome this technological inadequacy of the prior art, which prevents unanticipated remote agents not falling within the preconfiguration model of the local MIS from engaging in local MIS communications.

It is additionally desirable to avoid technical problems arising when a remote agent or another remote communication entity, such as a remote MIS, or third party manager, is not recognized by the local MIS. Such a failure to recognize the remote entity prevents communication from being established.

It is further desirable to make unpreconfigurable remote agent communication possible with local MIS entities, as well as user transparent and convenient for rapid implementation.

SUMMARY OF THE INVENTION

According to one embodiment of the present invention, a computer network includes an object-oriented local MIS which is run-time configurable for communication with remote agents of unknown architectural configuration, and a common management information protocol (CMIP) MPA enabling communication between the local MIS and remote agents characterized by an unknown information model, by translation of management object instances and agent object instances. The computer network, according to the present invention, can implement installation of a computer program product according to one embodiment of the present invention and is able to identify remote agent communication events representing remote agent association requests received by the CMIP MPA. The CMIP MPA runs a code mechanism for translating messages transmitted between a remote agent and said local MIS. More particularly, according to the present invention, unregistered remote agents are represented in a local MIS for communication through a common management information protocol (CMIP) MPA, by identifying remote agent communication events representing a remote agent association request received by a CMIP MPA. Messages transmitted between a remote agent and a local MIS are translated by the CMIP MPA. According to one embodiment of the present invention, a remote agent is represented in the local MIS as an object identifying a communication configured remote agent entity.

BRIEF DESCRIPTION OF THE DRAWINGS

FIG. 5 is a block diagram of a name translation object class (NTOC) which is effective for translating names according to a translation call according to the present invention.

DETAILED DESCRIPTION OF A PREFERRED EMBODIMENT

Figure 1A:
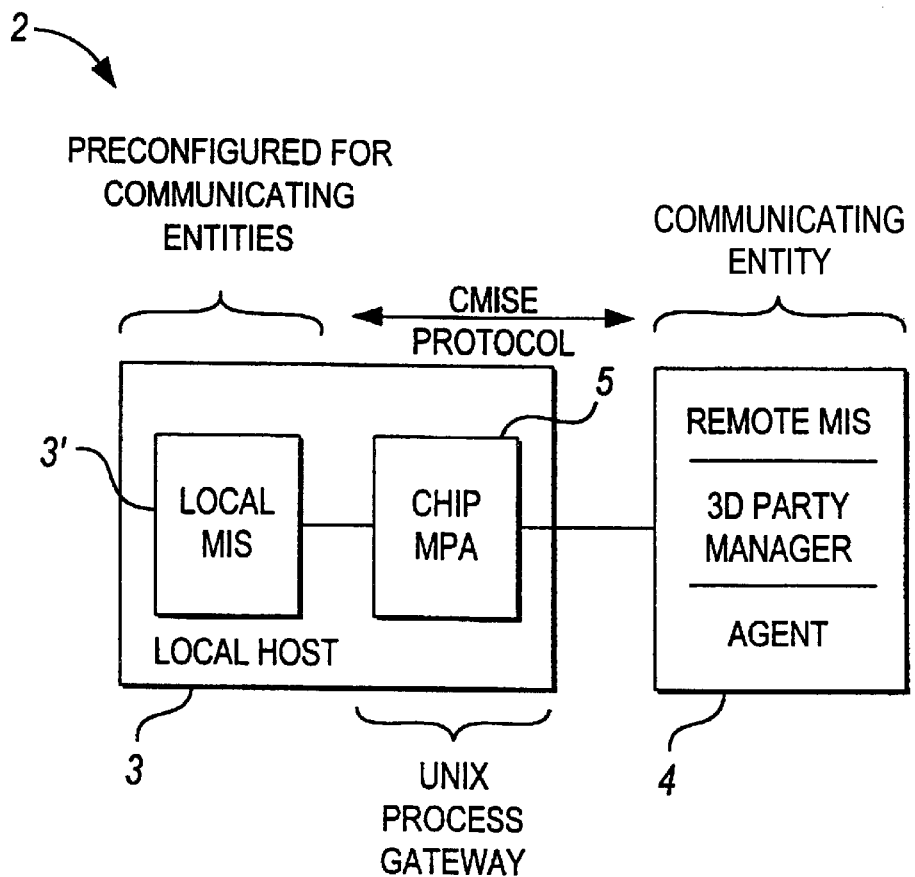
FIG. 1A is a block diagram of a computer network implementing common management information protocol (CMIP) communications between a local MIS and a preconfigured remote agent, according to the prior art.
Figure 1B:
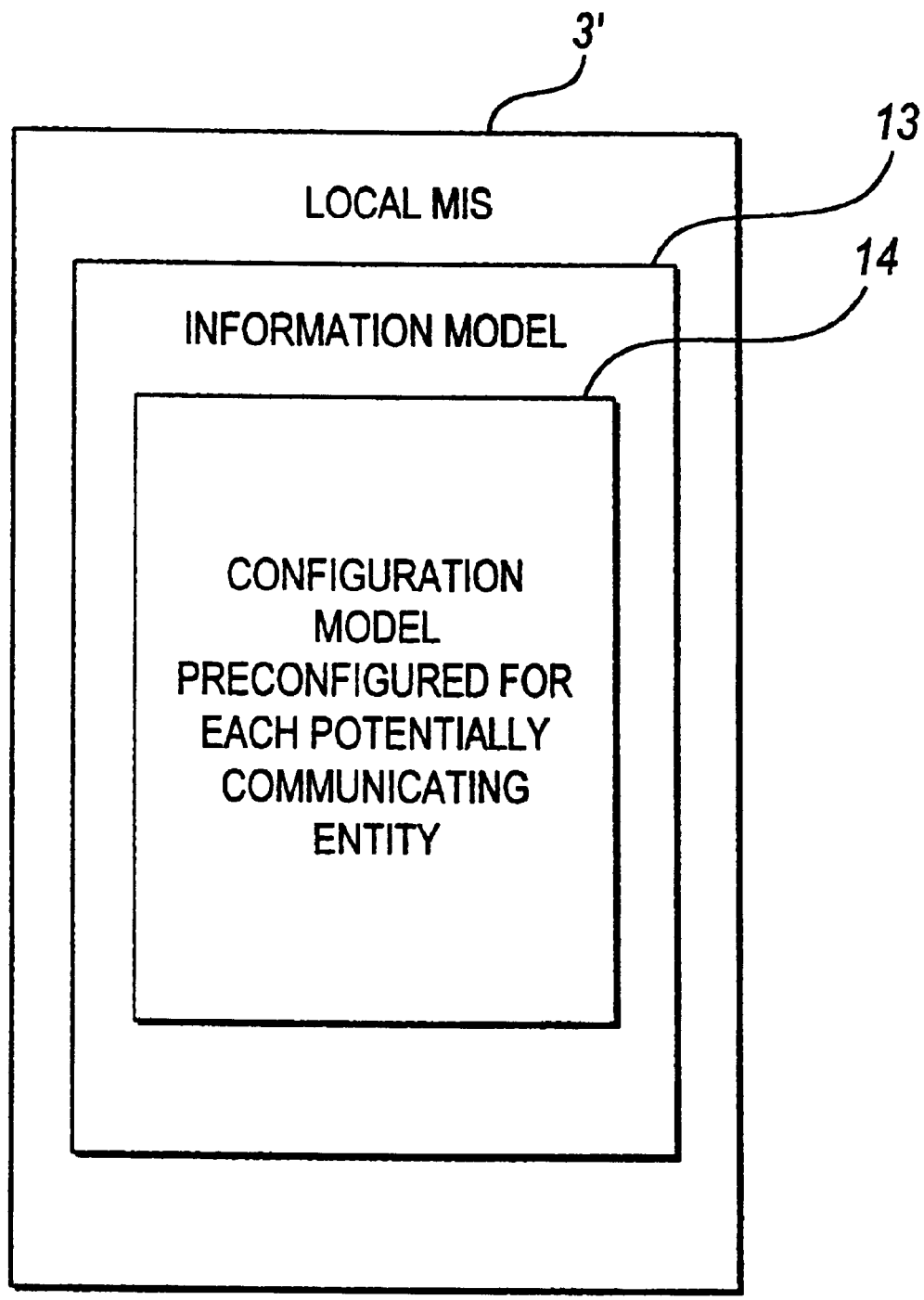
FIG. 1B is a block diagram of a local MIS including an information model in turn including a configuration model which is preconfigured according to the prior art for each potentially communicating remote entity or agent.
Figure 2A:
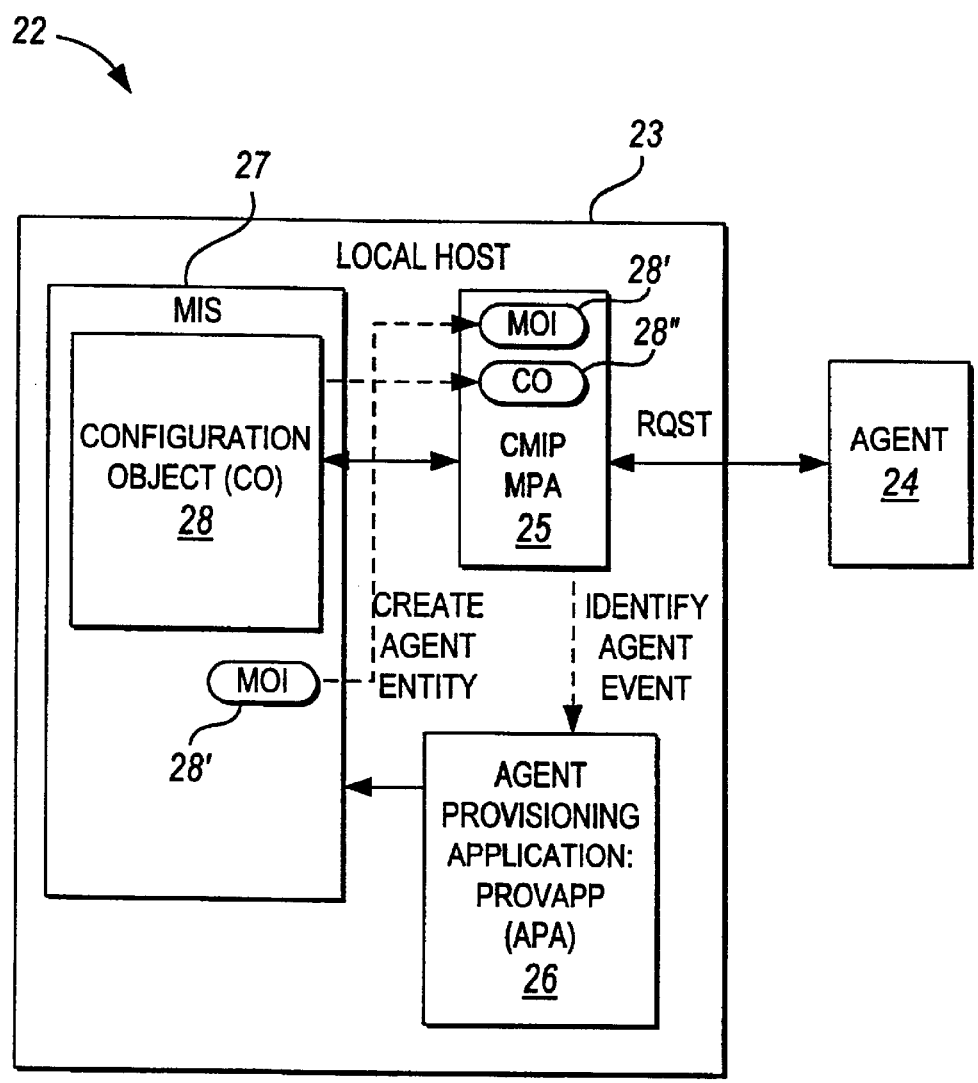
FIG. 2A is a block diagram of a local host including a local MIS having a CMIP agent entity, in communication with a CMIP MPA in turn communicating with an agent provisioning application (APA) for identifying remote agent communication requests, according to the present invention.

FIG. 2A is a block diagram of a computer network 22 including a local host 23 and a remote agent 24 seeking communication with local host 23. Local host 23 includes a CMIP MPA 25, an agent provisioning application (APA) 26, and a local MIS 27. Local MIS 27 includes a CMIP agent entity object 28 according to the present invention as a result of an unregistered agent request for communication and creation of the entity by CMIP MPA 25 and APA 26 according to the present invention. Local MIS 27 further includes at least a single managed object instance (MOI) 28' representing a preconfigured agent configuration. Local MIS 27 is in communication with CMIP MPA 25 which in turn is in communication with APA 26 for identifying remote agent communication requests, according to the present invention. An external entity such as remote agent 24 makes an association request according to the present invention to the known address of the local host 23 running MIS 27. This request is initially received according to the present invention by CMIP MPA 25 running on host 23. Known agents with which the local host 23 can communicate are represented according to the present invention as objects of class "cmipAgent". Agent 24 not yet known or registered with MIS 27 is represented according to the present invention as an object of the class "cmipAgentEntity", as discussed in greater detail below. The class cmipAgentEntity object is derived from a cmipAgent object which has been preconfigured and has a field named XLatFlag to indicate the kind of name translation desired between a new agent 24 and the local MIS 27. CMIP MPA 25 maintains an album of each object created for these two object types. For example, MOI 28' and CO 28 are each copied into CMIP MPA 25. When an association request is received by CMIP MPA 25, a check is undertaken based upon the network address of agent 24 whether an object representing the particular agent 24 has been configured in local MIS 27. If such an object is found in the system, the particular agent 24 is considered to be configured for the system, and communication between manager side applications and agent 24 can proceed forthwith. If the agent 24 is found not to have been configured in the system, CMIP MPA 25 generates an event of type IdentifyAgent with an information field containing the network address of the agent 24 which has been identified. This event is recognized by agent provisioning application (APA) 26, according to one embodiment of the present invention, and MIS 27 then configures the new agent for the system by creating an object of the class cmipAgentEntity corresponding to this particular agent. APA 26 recognizes identify agent event. Then, based on the network address of the agent, APA 26 anchors an information model describing the new agent with MIS 28. The FDN of the local branch of the MIS 28 is obtained by mapping the network address of the agent according to the present invention. This mapping is stored according to one embodiment of the present invention in a flat UNIX file (agent.db). The cmipAgentEntity object representing the new agent is accordingly implemented as cmipAgentEntity which is dynamically linked into MIS 27. The cmipAgentEntity object class is defined in the cmipentity.gdmo and cmipentity.asn1 files attached herewith as an appendix. Communication from management applications to external entities or agents is managed by CMIP MPA 25. The C++ object class MpaPmi implements the name translation rules specified by the cmipAgentEntity object instance, as described with respect to the object model MpaPmi class. Incoming and outgoing requests are passed through public methods of class MpaPmi. Calls to class Mpa Pmi in CMIP MPA 25 are made from a single function call translate OI() according to the present invention. The identify Agent event is defined in the agentinden.gdmo and agentiden.asn1 files, as listed in Appendix A.

Figure 2B:
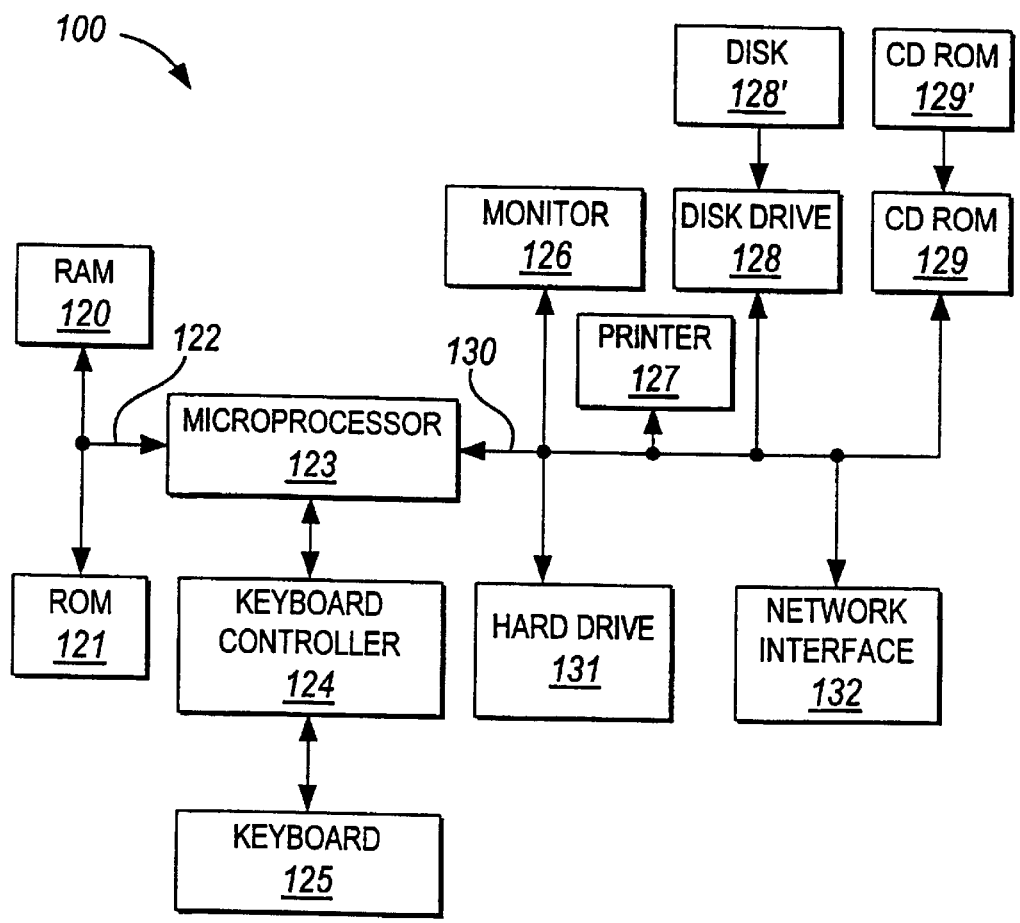
FIG. 2B is a block diagram of a computer system which can be used as local host, a local MIS, or a CMIP MPA in accordance with the present invention.

FIG. 2B is a block diagram of a computer system 100 which can be used as local host, a local MIS, or a CMIP MPA, in accordance with particular embodiments of the present system. Computer system 100 particularly includes a random access memory (RAM) 120, a read only memory (ROM) 121, a memory bus 122 connected to RAM 120 and ROM 121, a microprocessor 123 connected to the memory bus 122, a monitor 126, a printer 127, a disk drive 128, a compact disk read only memory (CD ROM) drive 129, a peripheral bus 130 connected to monitor 126, a printer 127, a disk drive 128, a CD ROM drive 129, a hard drive 131, and a network interface connected to peripheral bus 130. Disk drive 128 and CD ROM drive 129 are respectively able to read information including computer program products (not shown) which can be embedded on media such as, respectively, a magnetic or optical disk or floppy 128' or a CD ROM medium 129'. Depending upon the selected drive and medium, writing on the selected medium as well as reading can be accomplished.

Figure 2C:
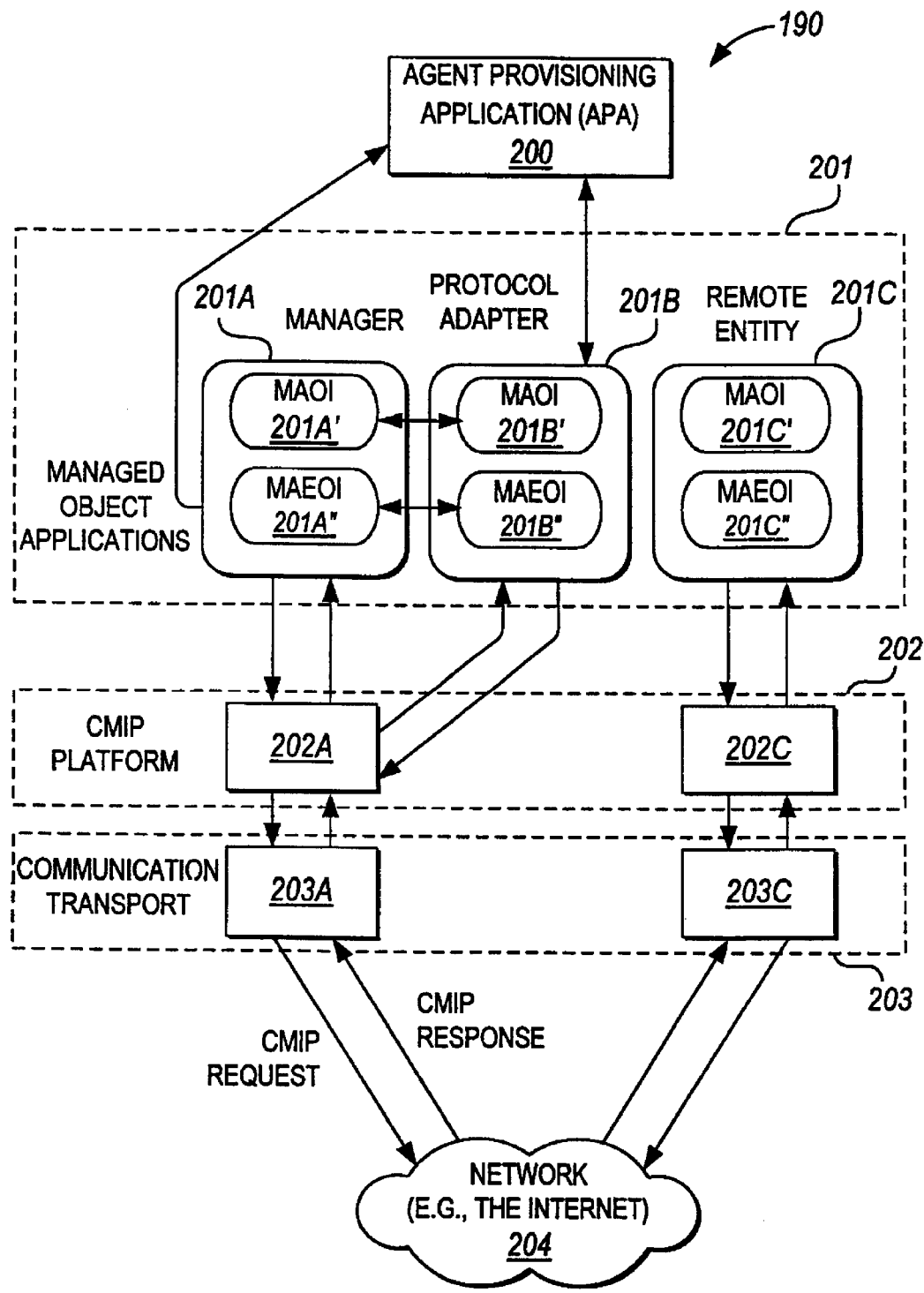
FIG. 2C is a diagram of a computer network according to the present invention.

FIG. 2C is a diagram of a computer network 190 according to the present invention. In particular, computer network 190 includes an APA 200; managed object applications 201A–201C; CMIP platforms 202A and 202C; communication transports 203A and 203C; and network 204, for example the Internet. Each managed object application 201A–201C includes corresponding managed agent object instances (MAOIS) 201A'–201C' and managed agent entity object instances (MAEOIs) 201A"–201C". Managed object applications (MOA) 201A–201C include a manager MOA 201A, a protocol adapter MOA 201B, and an agent MOA. APA 200 creates MAEOIs in manager MOA 201A and these are copied into protocol adapter MOA for protocol adaptation processing of messages between manager MOA and agent MOA.

Figure 3:
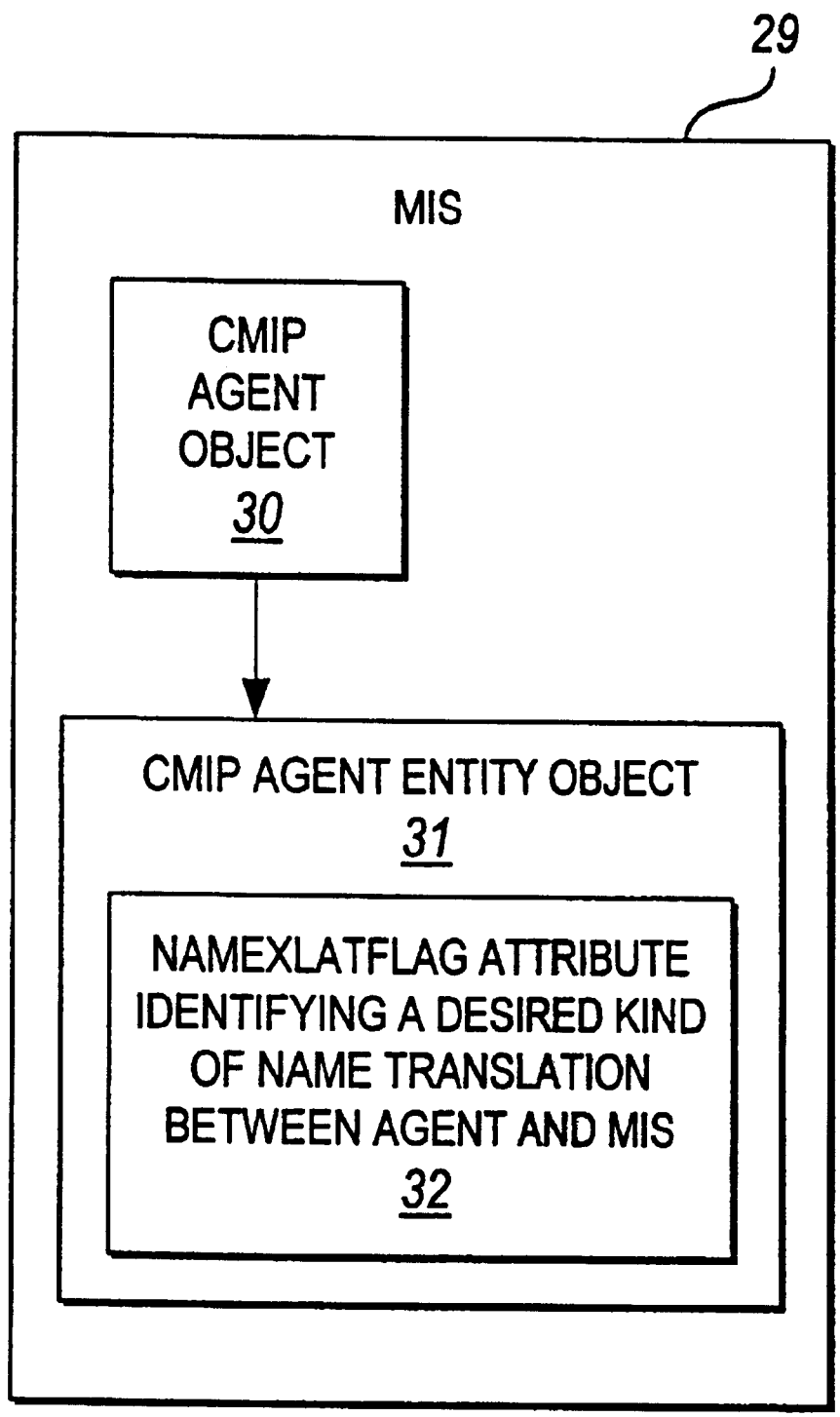
FIG. 3 is a block diagram of a local MIS including a CMIP agent object and instantiated therefrom, a CMIP agent entity object having an attribute employed as a flag to identify the kind of name translation applicable to the registration of new, previously unconfigured remote agents, according to the present invention.

FIG. 3 is a block diagram of a local MIS 29 according to the present invention. In particular according to the present invention, MIS 29 includes at least a single CMIP agent object 30. CMIP agent entity objects 31 are instantiated according to the present invention from this at least a single CMIP agent object 30. The agent entity object 31 instantiated thus receives the inherited characteristics of its parent object, the CMIP agent object. The CMIP agent entity object further has an attribute 32 identifying the kind of name translation desired for registration of a particular new agent 24. An agent 24 is thus generally represented by an object of type cmipAgent. The cmipAgent object class has attribute managed DNs which specify the FDN(s) of an anchor point of remote agent 24. An instance of object class cmipAgent can be created by em_oct-cmip command. EM MIS 25 forwards management communication which involve particular anchor points to remote agent 24 via MPA 25. The object class cmipAgentEntity, according to one embodiment of the present invention is derived from its object class cmipAgent to inherit cause inheritance of the basic behavior of the cmipAgent object. As noted, this class has an attribute nameXlatFlag which indicates a desired kind of mapping of names between MIS 27 and the agent is to be achieved.

Figure 4:
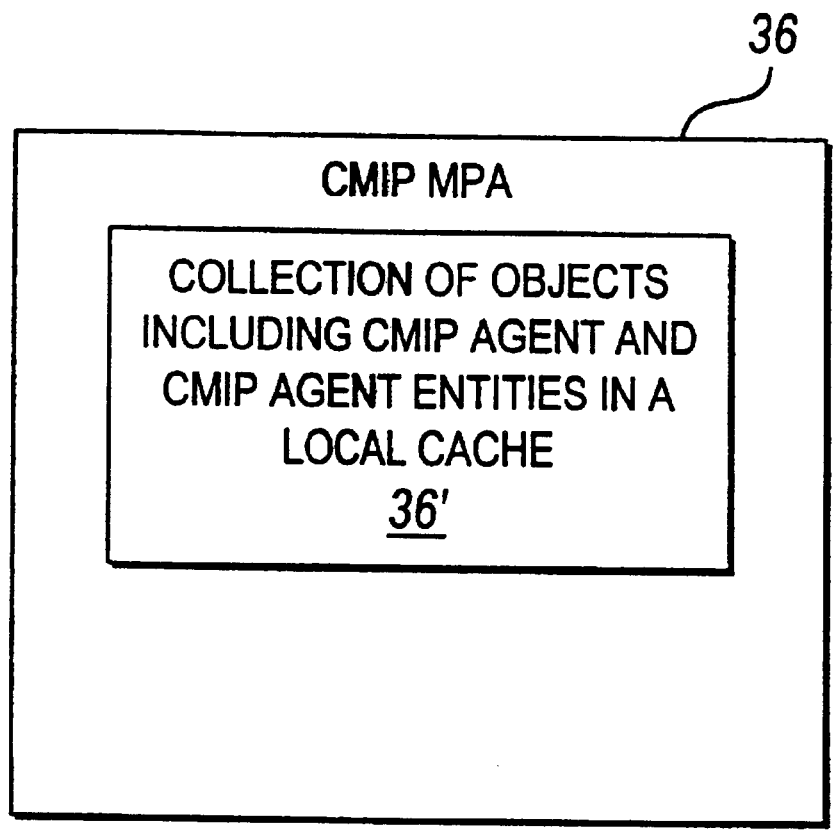
FIG. 4 is a block diagram of a CMIP MPA in accordance with the present invention, including a tracking and autoimaging album of tracking objects and autoimaging objects.

FIG. 4 is a block diagram of a CMIP MPA 35 in accordance with the present invention, including a tracking and autoimaging album 36 for recording objects which have been established as agent objects or agent entity objects. According to the present invention, messages going to and from CMIP MPA 25 are passed via the function translate OI() which is expressed as: void translateOI(MessagePtr pMsg, int flag), where pMsg is a message pointer, and the flag is an integer which has value FROMMIS or FROMAGENT. According to the present invention, when message is FROMMIS, the MpaPmi::manager2AgentN() function is invoked. The Name Translation Object Class: Mpa Pmi is a static object class which is responsible for name translation with the translateOI() function, to call first and second public methods manager2AgentDN() and agent2ManagerDN() for respectively translating names from manager to agent model and agent to manager information model. MpaPmi has private methods including MpaPmi(). The constructor for the object class MpaPmi() is private and the MpaPmi object is constructed internally when a first call is made to any of the public methods of MpaPmi(). As a first step, a platform connect call is made to MIS 27. An album is established of all the objects of type cmipAgent and cmipAgentEntity. The function Result prefix_found(Asn1Value&mgr_prefix, Asn1Value&mol, Asn1Value&aoi, Int is_Idn) is called from the public method manager2AgentDN() according to the present invention. The inputs of the function are mgr_prefix, moi and is_Idn and the output agent object instance (aoi). The function returns TRUE, if moi contains the mgr_prefix. In such a case, aoi is set to the component RDNs of moi minus the components of the mgr_prefix. The format of aoi, i.e., distinguishedName or localDistinguishedName is determined by the input flag, is_Idn. Otherwise, the function returns FALSE. For example, if moi is '/systemId=name:"host1"/managedElementId=1' and mgr_prefix is '/systemId=name:"host1"' then returned aoi will be 'managedElementId=1' if is_Idn is 1 or will be '/managedElementId=1' if is_Idn is 0. Mpa Pmi has a public interface including the static functions Result manager2AgentDN, Reset Agent2managerDN, static Result manager2AgentDN(DU &pddr, DU &aetitle, Asn1Value&moi, Asn1Value&aoi). For all the messages originating from MIS, translate OI() calls a static public function with paddr and moi as the input and aoi as the output parameter. This function returns TRUE if manager object instance moi is translated into agent object instance aoi, otherwise it returns FALSE. The AeTitle:{paddr} field is the unique identification of the agent. In the object cmipAgent and cmipAgentEntity, the field agentAddressInfo stores the returned agent address. This function iterates through all the objects contained in the album al, and tries to find a match for the particular agent. If an object of type cmipAgentEntity exists for this paddr, and if the object has nameXlatFlag set to "FDN" or "LDN", the function indicates that name translation for the agent specified is needed. Accordingly, the method prefix_found() is called to perform name translation. The value of mgr_prefix required to implement the name translation function is the value of managedDNs attribute for the corresponding object.

For all the messages coming from agent 24, the function translateOI() is called with the values paddr and aoi being input, and moi being an output parameter. The function translate OI() returns TRUE, if the agent object instance aoi is successfully translated into, according to the present invention, manager object instance moi; otherwise the function translate OI() returns FALSE. Next function, translate OI() searches to locate the cmipAgentEntity object to which the message is to be sent. If the object is found, translate OI() prepends the RDN components of the managedDNs attributes to the aoi, to form the manager object instance. The output moi is expressed in FDN format according to the present invention. For example, if aoi is 'managedElementId=1'; the managedDNs attribute has a value of '/systemId=name:"host1"', and the name XlatFlag indicates that name translation is desired, the resulting manager object instance will be '/systemId=name:"host1"/managedElementId=1'.

The static function is Agent Present (DU and pddr, DU and aetittle) returns TRUE, if the agent identified by the paddr field matches any object present in the album. For any new association request this function is called by the CMIP MPA to check, whether the particular has been configured in the system or not.

FIG. 5 is a block diagram of a name translation object (NTO) class 40 which is effective for translating 41 MIS and agent names, according to the present invention. The NTO class 40 particularly includes a code mechanism 42 for translating management object instances (moi) into agent object instances (aoi) and vice-versa, according to the present invention.

Figure 6:
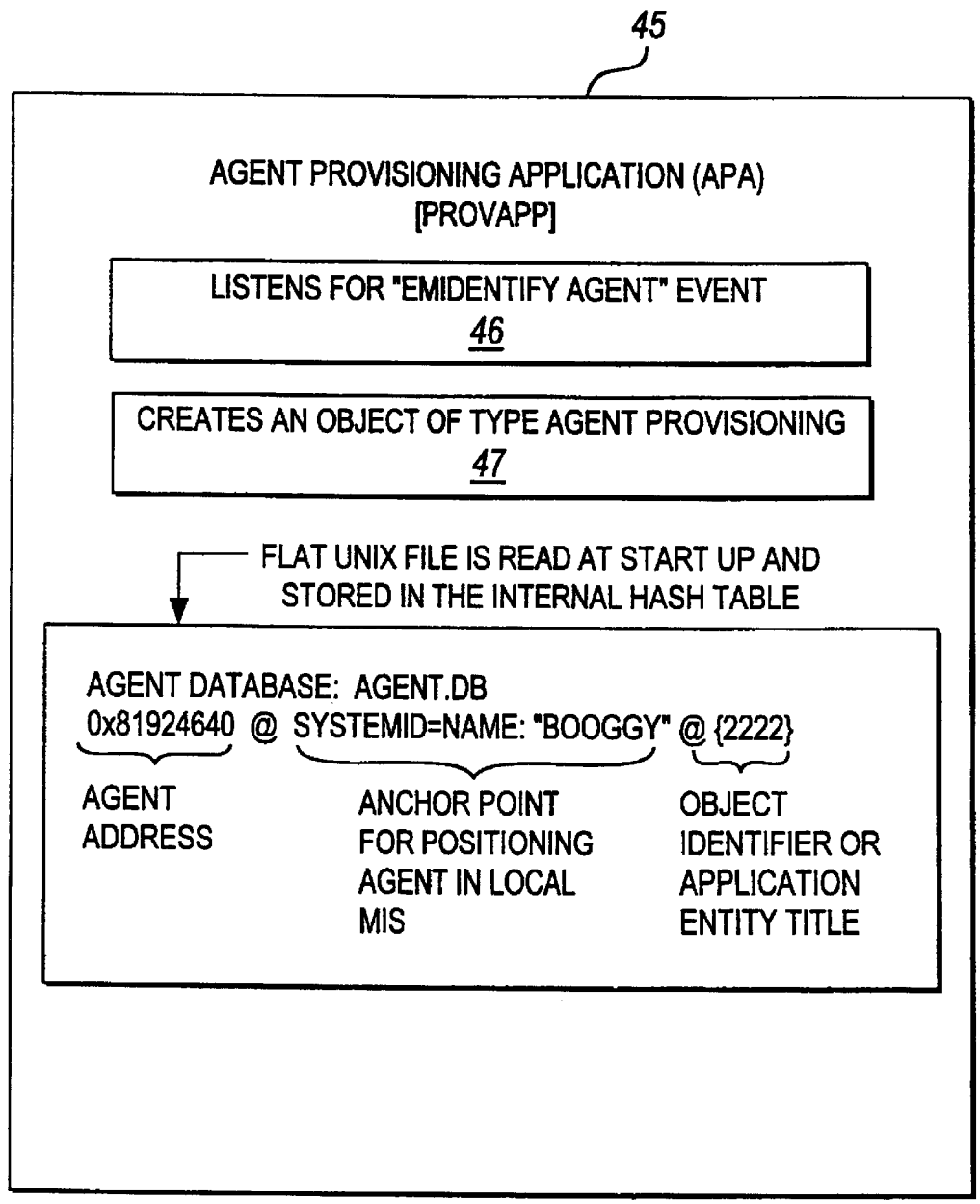
FIG. 6 is a block diagram of an agent provisioning application (APA) according to the present invention.

FIG. 6 is a block diagram of an agent provisioning application (APA) 45 according to the present invention. APA 45 includes a mechanism 46 for listening for an agent identification event during which the CMIP MPA 35 receives a communication request from a remote agent. APA 45 particularly includes a code mechanism 47 for creating an object of a predetermined agent provisioning type. APA 45 further includes an agent database 48 of data regarding agents requesting communication with the local MIS 27. The data in the agent database 48, according to one embodiment of the present invention, includes a network address, and an anchor point for representing an unpreconfigured remote agent 24 with a local MIS 27.

The Agent provisioning application:provapp 126, according one embodiment of the present invention listens only for an IdentifyAgent event and then based on the network address of the identifiedAgent 24, APA 26 anchors the information model associated with the new agent 24 with a mapping of the network address of the agent, which is the stored in a flat UNIX file (agent.db). A typical entry in agent.db file is configured as follows: 0x81924b40@/systemId=name:"booggy"@{2222}, where the first field 0x81924b40 is the network address of the agent; the second field/systemId=name:"booggy" is the anchor point where the agent is to be positioned; and the last field {2222} is the object identifier which this agent wishes to use as an application entity title. This file is read at the start up time for agent provisioning. The file is then stored, according to one embodiment of the present invention in an internal hash table, for example. Once an event of type emIdentifyAgent is received by this application, the network address of the agent is obtained, and a corresponding entry from the agent database is retrieved. Then all the attributes of the AgentEntity table are set and a new entry for this agent is established. Once this agent entry has been created, the fdntable of MIS 27 is updated, and communication from and to this agent with the proper name translation is completed. In the default case, a cmipAgentEntity table entry is established with a nameXLatFlag of NONE, indicating that no name translation is needed. APA 126 includes an agent provisioning object, effective for dynamic agent provisioning. Provapp creates one object of this type to complete static callback functions.

APPENDIX A

GDMO AND ASN1 FILES

This appendix lists all the GDMO and ASN1 files according to one embodiment of the present invention.
A.1  Events Defrnition: agentIden.gdmo
MODULE "EM IDENTITY-AGENT EVENT"
emIdentifyAgentEventPackage PACKAGE
BEHAVIOUR emIdentifyAgentEventPackageDefinition BEHAVIOUR
DEFINED AS
This package represents an event which is generated by the EM cmip
(em_cmip) after an agent establishes an association which is not configured in
EM MIS Manager.
For these agents whose identity is not pre-configured an agent naming service can
listen for these events and configure these agent in EM Manager by creating an
entry in cmipAgentEntity table. This object class configures remote agent as well
as can indicate to mpa about the name translation needed between local dn and dn
format by identifying local root of the agent as part of managedDNs attribute and
setting IdnXlateFlag.1;
;
NOTIFICATIONS
emIdentifyAgent;
;
emIdentifyAgent NOTIFICATION
BEHAVIOUR emIdentifyAgentBehaviour BEHAVIOUR DEFINED AS
!This notification is emitted when an agent which is not configured in the em
manager establishes an association this event identifies agent by its paddress and
aetitle fields.!;
;
WITH INFORMATION SYNTAXEM-IDEN-AGENT-ASN1.EMIdentifyAgent;
REGISTERED AS { em-identify-agent-notification 1 };
;
emReleaseAgent NOTIFICATION
BEHAVIOUR emReleaseAgentBehaviour BEHAVIOUR DEFINED AS
!This notification is emitted when an application wants cmip mpa to release the
association with agent identified by this event field.1;
;
WITH INFORMATIONN SYNTAX EM-IDEN-AGENT-
ASN1.EMIdentifyAgent; REGISTERED AS { em-identify-agent-notification 2
};
;
END
A.2  Events Definition Syntax: agentIden.asn1
EM-IDEN-AGENT-ASN1 {
iso(1) org(3) dod(6) internet (1) private(4) enterprises(1) sun(42) producrs(2)
management(2) em(2) identifyAgent(66) 0
}
DEFINITIONS::=
BEGIN
IMPORTS
AE-TITLE
FROM ACSE-1 {joint-iso-ccitt association-control(2) abstract-syntax(1) apdus(0)
version(1)}
em-identify-agent OBJECT IDENTIFIER::= {
iso(1) org(3) dod(6) internet(1) private(4) enterprises(1) sun(42) products(2)
management(2) em(2) identify Agent(66)
}
em-identify-agent-notification OBJECT IDENTIFIER::={
EMIdentifyAgent::=SEQUENCE {
aETitle AE-title    OPTIONAL,
pSelector      GraphicString,
pSelector      GraphicString,
tSelector      GraphicString,
nSAP           GraphicString
}
END
A.3  Agent Object Definition: cmipentity.gdmo
MODULE "EM CMIPAGENT ENTITY"
--Object Class definition
cmipAgentEntity MANAGED OBJECT CLASS
DERIVED FROM "EM MPA": cmipAgent;
CHARACTERIZED BY
cmipAgentEntityPkg PACKAGE
BEHAVIOUR
cmipAgentEntityPkgBehaviour BEHAVIOUR
DEFINED AS
    "This managed object class is used to represent the CMIP agent entity for
CMIP Agent managed by SEM MIS.";:
ATTRIBUTES
nameXlatFlag

APPENDIX A-continued

GDMO AND ASN1 FILES

```
DEFAULT VALUE CmipAgentEntity-ASN1.nameXlatFlagDefault
GET-REPLACE,
aeQualifier
DEFAULT VALUE CmipAgentEntity-ASN1.aeQualifierDefault
GET-REPLACE,
apInvokeId
DBFAULT VALUE CmipAgentEntity-ASN1.aeQualifierDefault
GET-REPLACE,
aeInvokeId
DEFAULT VALUE CmipAgentEntity-ASN1.aeInvokeIdDefault
GET-REPLACE:::
REGISTERED AS {em-cmipagententity-objectClass 1 };
FROM CMIP-1 {joint-iso-ccitt ms (9) cmip(1) modules (0) protocol(3)}
DistinguishedName
FROM InformationFramework {joint-iso-ccitt ds(5)
modules (1) informationFramework(1) }
AE-title.AE-qualifier.AP-invocation-id.AE-invocation-id
FROM ACSE-1 {joint-iso-ccitt associaton-control(2) abstract-syntax(1) apdus(0)
version (1)}
em-cmipagententity OBJECT IDENTIFIER::=
{iso(1) org(3) dod(6) internet(1) private(4) enterprises(1) sun (42) products(2)
management(2) em(2) cmipAgentEntity(65) }
em-cmipagententity-objectClass OBJECT IDENTIFIER ::= {em-cmipagententity
3}
em-cmipagententity-attribute OBJECT IDENTIFIER ::= {em-cmipagententity 7}
em-cmipagententity-binding OBJECT IDENTIFIER ::= {em-cmipagententity 6}
em-cmipagententity-action OBJECT IDENTIFIER ::= {em-cmipagententity 9}
em-cmipagententity-notification OBJECT IDENTIFIER ::= {em-cmipagententity
10}
---DefaultValues
nameXlatFlagDefault GraphicString::= "NONE"
aeQualifierDefault AE-qualifier::=-1
apInvokeIdDefault AP-invocation-id::=-1
aeInvokeIdDefault AE-invocation-id::=-1
NameXlatFlag::= Graphic String
```

What is claimed is:

1. A method for causing unregistered remote agents to be represented in a local management information server (MIS) to enable communication through a selected protocol adapter, said method comprising:

identifying an unregistered non-preconfigured remote agent making a remote agent association request to a local MIS through a selected protocol adapter associated with the local MIS;

configuring the local MIS with an instance of an agent entity object, having a name translation attribute specific to the unregistered non-preconfigured remote agent; and translating messages transmitted between the unregistered non-preconfigured remote agent and a local MIS consistent with a remote agent specific name translation attribute.

2. The method according to claim 1, including determining whether the remote agent making the remote agent association request has been preconfigured with the local MIS, and identifying such remote agent as said unregistered non-preconfigured remote agent if such remote agent is not preconfigured with the local MIS.

3. The method according to claim 1, wherein said selected protocol adapter follows a common management information protocol (CMIP).

4. The method according to claim 2, wherein said translation attribute describes a mapping of names between said local MIS and said unregistered non-preconfigured remote agent.

5. The method according to claim 1, wherein said agent entity object represents a common management information protocol (CMIP) based remote management entity.

6. The method according to claim 5, including instantiating a CMIP agent entity object from a CMIP agent object which has been pre-installed in said local MIS.

7. The method according to claim 1, wherein said protocol adapter translates messages between said local MIS and said unregistered non-preconfigured remote agent.

8. The method according to claim 1 including representing a translation object in said protocol adapter for translating messages between said local MIS and said unregistered non-preconfigured remote agent.

9. The method according to claim 1 including passing messages between said local MIS and said unregistered non-preconfigured remote agent through a predetermined translation function.

10. The method according to claim 1, wherein the local management information server is run-time configurable for communication with the unregistered non-preconfigured remote agent.

11. The method according to claim 1, wherein identifying the unregistered non-preconfigured remote agent comprises dynamically linking the unregistered non-preconfigured remote agent with the local MIS.

12. The method according to claim 1, wherein the remote agent association request to the local MIS is unanticipated by the local MIS.

13. A computer program product, comprising:

a computer storage medium and a computer program code mechanism embedded in the computer storage medium for causing unregistered non-configured remote agents to be run-time represented as an agent entity object in a local MIS for communication ennoblement through a selected management information protocol adapter, the computer program code mechanism comprising:

a first computer code device configured to identify unregistered non-preconfigured remote agent communication requests received by said protocol adapter and to respond to said identification by instantiating a corresponding agent entity object in the local MIS; and a second computer code device configured to translate messages transmitted between an unregistered non-preconfigured remote agent and a local MIS in accordance with the character of said agent entity object.

14. The computer program product according to claim 13, wherein said first computer code device includes a computer program code mechanism for determining the information model of the unregistered non-preconfigured remote agent and anchoring the program code in the local MIS based upon a mapping of said unregistered non-preconfigured remote agent and local MIS names held in an agent database maintained by said protocol adapter held by said management information protocol adapter.

15. A computer network comprising:

a local MIS;

a selected protocol adapter in communication with said local MIS to enable message traffic with an unregistered non-preconfigured remote agent characterized by an unknown information model; and a code mechanism for identifying remote agents and remote agent association requests received by said selected protocol adapter as registered remote agents or unregistered non-preconfigured remote agents, said code mechanism being coupled for communication with said selected protocol adapter;

said selected protocol adapter including a device for translating messages transmitted between a remote agent and said local MIS in accordance with the identification of said remote agents.

16. The computer network according to claim 15, wherein said local MIS includes an agent entity object instance identifying a remote agent which makes a run-time association request with respect to the local MIS.

17. The computer network according to claim 16, wherein said local MIS includes an common management information protocol (CMIP) agent entity object instantiated from said agent entity object, said agent entity object having a translation attribute describing translation of messages between said local MIS and a remote agent.

18. The computer network according to claim 15, wherein said agent entity object is a common management information protocol (CMIP) object.

19. The computer network according to claim 18, wherein said translation attribute describes a selected mapping of names between said local MIS and said unregistered non-preconfigured remote agent.

20. The computer network according to claim 15, wherein said selected protocol adapter translates messages between said local MIS and said unregistered non-preconfigured remote agent.

21. The computer network according to claim 15 including a translation object in said selected protocol adapter for translating messages between said local MIS and said unregistered non-preconfigured remote agent.

22. The computer network according to claim 15 including a translation function for operating upon messages passing between said local MIS and said unregistered non-preconfigured remote agent.

23. A method for causing unregistered remote agents to be represented in a local management information server (MIS) to enable communication through a selected protocol adapter, said method comprising:

identifying an unregistered remote agent making a remote agent association request to a local MIS through a selected protocol adapter associated with the local MIS;

configuring the local MIS with an instance of an agent entity object, having a name translation attribute specific to the unregistered remote agent, the attribute including mapping a network address of the agent;

anchoring an information model describing said agent with the local MIS based on said network address; and translating messages transmitted between the unregistered non-preconfigured remote agent and a local MIS consistent with a remote agent specific name translation attribute.

24. The method according to claim 23, including determining whether the remote agent making the remote agent association request has been preconfigured with the local MIS, and identifying such remote agent as said unregistered remote agent if such remote agent is not preconfigured with the local MIS, wherein said translation attribute describes a mapping of names between said local MIS and said unregistered non-preconfigured remote agent.

25. The method according to claim 24, including instantiating a common management information protocol (CMIP) agent entity object from a CMIP agent object which has been pre-installed in said local MIS.

26. The method according to claim 23 including representing a translation object in said protocol adapter for translating messages between said local MIS and said unregistered remote agent.

27. A computer network comprising:

a local MIS;

a selected protocol adapter in communication with said local MIS to enable message traffic with an unregistered non-preconfigured remote agent characterized by an unknown information model; and a code mechanism for identifying remote agents and remote agent association requests received by said selected protocol adapter as registered remote agents or unregistered remote agents, said code mechanism being coupled for communication with said selected protocol adapter, said code mechanism configuring the local MIS with an instance of an agent entity object, having a name translation attribute specific to the unregistered remote agent, the attribute including mapping a network address of the agent and said code mechanism anchoring an information model describing said agent with the local MIS based on said network address; and said selected protocol adapter including a device for translating messages transmitted between a remote agent and said local MIS in accordance with the identification of said remote agents.

28. The computer network according to claim 27, wherein:

said local MIS includes an agent entity object instance identifying a remote agent which makes a run-time association request with respect to the local MIS;

said local MIS including an common management information protocol (CMIP) agent entity object; and said agent entity object has a translation attribute describing translation of messages between said local MIS and a remote agent.

* * * * *